3,537,811
PROCESS OF DYEING AROMATIC POLYESTER FIBERS WITH NITRODIPHENYLAMINE DISPERSE DYES AND DYED PRODUCTS THEREOF
Hans Alfred Stingl, Toms River, N.J., assignor to Toms River Chemical Corporation, Toms River, N.J., a corporation of Delaware
No Drawing. Filed Jan. 16, 1968, Ser. No. 698,142
Int. Cl. D06p 3/54
U.S. Cl. 8—176                8 Claims

ABSTRACT OF THE DISCLOSURE

Nitrodiphenylamine compounds of the formula

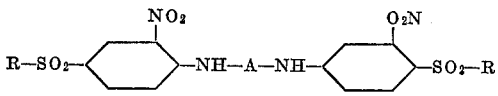

in which A is an arylene radical or an alkylene radical and R is alkyl, amino or substituted amino are yellow to orange dyestuffs particularly suitable for the dyeing and printing of synthetic fibers, notably polyalkylene terephthalate fibers.

BACKGROUND OF THE INVENTION

It is known to employ dyestuffs of the general formula

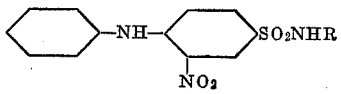

where R is hydrogen or phenyl for the dyeing of artificial fibers. However, the dyeings which are obtained are not completely satisfactory in their fastness properties and, in particular, do not possess the desired sublimation fastness.

This limitation is of particular importance in the dyeing of polyester fibers.

Polyester fibers present particular dyeing problems, arising at least in part out of the hydrophobic nature of such fibers. In the dyeing of polyester fibers, the class of dyes known as disperse dyestuffs has come to have the widest application. These dyestuffs are essentially water-insoluble products applied in a finely divided condition from a dispersion. In the application of such dyestuffs, the dyeing difficulties associated with polyester fibers have been met by the development of special methods for the application of disperse dyes to the fibers. Of these methods, the one known as the Pad/Thermofix method has become of increasing importance since it is particularly adapted for high-speed, continuous dyeing operations. In this method, a fabric is padded by passing it through an aqueous suspension of the dyestuff and squeezing the fabric between closely-set rollers in order to remove excess dye liquor. The dyestuff is only loosely attached to the fiber at this point. The dyestuff is then fixed on the fiber by subjecting the material to a short, intensive heat-treatment at elevated temperatures of the order of about 120–220° C. It is evident that a dyestuff, in order to be suitable for application by this method, must be fast to sublimation or else it will wholly or partially volatilize from the fiber during the heat-treatment step.

SUMMARY OF THE INVENTION

In accordance with the present invention, it has been found that valuable dyeings and printings are produced on synthetic fibrous materials, particularly aromatic polyesters, such as polyethylene terephthalate, by using as dyestuffs nitrodiphenylamine compounds of the formula

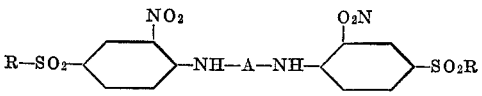

wherein A represents one of the following divalent radicals

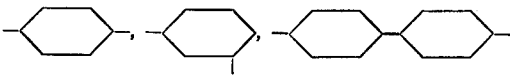

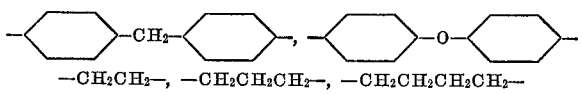

—CH₂CH₂—, —CH₂CH₂CH₂—, —CH₂CH₂CH₂CH₂—

R is alkyl, particularly lower alkyl such as methyl, ethyl, propyl, and butyl, or aralkyl such as benzyl, or $NH_2$, $NHR_1$, or $NR_1R_2$ where $R_1$ is lower alkyl, including methyl, ethyl, propyl or butyl, or phenyl and $R_2$ is lower alkyl, including methyl, ethyl, propyl or butyl.

The aromatic rings present in the radicals represented by A can be unsubstituted or substituted by one or more of lower alkyl, lower alkoxy, hydroxy or halogen. Thus, methyl, ethyl, propyl, butyl, methoxy, ethoxy, propoxy, butoxy, chlorine, bromine or various combinations thereof can be present in the aromatic radicals A.

DESCRIPTION OF THE PREFERRED EMBODIMENT

The nitrodiphenylamines of the present invention are prepared by condensing a 4-halo-3-nitrobenzene-alkyl-sulfone or sulfonamide of the formula

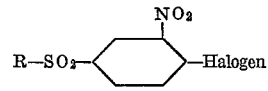

with an aromatic diamine in the molecular ratio 2:1. In the above formula "Halogen" is preferably chlorine.

The condensation can be carried out in an organic solvent, such as nitrobenzene or alcohol or in water, preferably at an elevated temperature, if necessary in the presence of an acid acceptor such as sodium acetate, magnesium oxide or calcium carbonate, or of a catalyst such as copper oxide. When water is used as the reaction medium, it is of advantage to use the diamine in the form of its dihydrochloride.

For dyeing, the said dyestuffs are preferably used in a finely divided form and the dyeing is carried out in the presence of a dispersing agent, such as sulphite cellulose waste liquor or a synthetic detergent, or a combination of different wetting and dispersing agents. Before dyeing, it is generally of advantage to convert the dyestuff or dyestuffs to be used into a dyestuff preparation which contains a dispersing agent and the finely divided dyestuff(s) in such a form as to yield a fine dispersion when the preparation is diluted with water. Dyestuff preparations of this kind can be made by known methods, for example, by grinding the dyestuff(s) either in dry or wet form with or without the addition of a dispersing agent.

The dyestuffs used in the invention are especially suitable for dyeing by the so-called thermofixation or Pad/Thermofix method, in which the fabric to be dyed is impregnated advantageously at a temperature not exceeding 60° C. with an aqueous dispersion of the dyestuff, which may contain 1 to 50% of urea and a thickening agent, especially sodium alginate, and the fabric is squeezed in the usual manner. The squeezing is preferably carried out so that the goods retain 50 to 100% of their weight of dye liquor.

The dyestuff is fixed by subjecting the impregnated fabric to a heat treatment at temperatures above 100° C., for example, at a temperature ranging from 120–220° C., it being of advantage to dry the fabric prior to this treatment, for example, in a current of warm air.

The thermofixation mentioned above is also of interest for the dyeing of mixed fabrics of polyester fibers and cellulose fibers, especially cotton. In this case, in addition to the dyestufl to be used in the process of the invention, the padding liquor contains a dyestuff suitable for dyeing cotton, for example, a direct dyestuff or vat dyestuff, or a so-called reactive dyestuff, i.e., a dyestuff capable of being fixed on cellulose fibers with the formation of a chemical bond, for example, a dyestuff containing a chlorotriazine or chlorodiazine residue. In the latter case it is of advantage to add to the padding liquor an agent capable of binding acid, for example, an alkali carbonate, alkali phosphate, alkali borate or alkali perborate, or a mixture of two or more of these agents. When vat dyestuffs are used, the padded fabric must be treated, after the heat treatment, with an aqueous alkaline solution of a reducing agent of the kind used in vat dyeing.

The dyeings produced on polyester fibers by the process of the invention are advantageously given an after-treatment, for example, by heating them with an aqueous solution of a non-ionic detergent.

Instead of applying the dyestuffs in the process by impregnation, they may be applied by printing. For this purpose, a printing color is used which, in addition to the usual printing assistants, such as wetting and thickening agents, contains the finely dispersed dyestuff, if desired, in admixture with one of the aforesaid cotton dyestuffs, and, if desired, in the presence of urea and/or agent capable of binding acid.

There are obtained by the practice of the present invention strong yellow to orange dyeings or prints of attractive shade and good color build-up having excellent fastness properties, especially a good fastness to sublimation and to light. The introduction of permanent crease fabrics has lent still further emphasis to the importance of sublimation fastness since the processes involved in the preparation of such fabrics require the curing at elevated temperatures for prolonged periods of the resin finishes applied for the achievement of permanent crease characteristics.

The term polyester defines synthetic polymeric polyesters, such as the highly polymeric linear polyesters, the molecules of which have recurring monomeric units connected by ester linkages. Dibasic acids, for example, aromatic acids, such as terephthalic acid, diphenyl-4,4'-dicarboxylic acid and/or diphenyl-sulfone-4,4'-dicarboxylic acid and dihydroxy compounds, for example, glycols, such as ethylene glycol, diethylene glycol, triethylene glycol, propylene glycol and/or butylene glycol, as well as other diols, such as 1,4-cyclohexyldiol can be used as the monomers to form the polymeric polyesters. Typical commercial examples of such fibers are Dacron, Terylene, Fortrel, Trevira, Terlanca, Kodel, Vicron, etc. They are disclosed, for example, in U.S. Pat. No. 2,901,466 and British Pat. Nos. 578,079, 579,462, 588,497 and 596,688.

The present invention is, of course, equally applicable to the dyeing of blends of polyester fibers and cellulosic fibers. The latter term includes native cellulose, such as linen or, more particularly, cotton, as well as regenerated cellulose, such as viscose of cuprammonium rayon.

The dyestuffs of the present invention are also suitable for coloring a wide variety of organic products, for example, plastic substances such as rubber, casein, polymerisation resins such as polyvinyl chloride and its copolymers, polyvinyl acetals, polyethylene, polypropylene, polystyrene and its copolymers with polyesters from unsaturated dicarboxylic acids and diols, polyacrylates and their copolymers, silicone and silicone resins. Furthermore, the pigments to be used according to the present invention are suitable for the manufacture of colored condensation resins, especially aminoplasts, for example, urea formaldehyde or melamine formaldehyde resins, polyaddition resins such as epoxy or polyurethane resins or alkyd resins, and for the manufacture of colored lacquers containing one or more of the resins mentioned in an organic solvent, or aqueous emulsions containing one or more of the said resins or precondensates, if desired in the presence of an organic solvent, for example, an oil-in-water or water-in-oil emulsion. Such emulsions are particularly suitable for impregnating or printing textile materials or other flat materials such as paper, leather or glass fiber fabrics, if necessary followed by curing with application of heat. The pigments to be used according to the present invention may also be used for the manufacture of spin-dyed fibers, for example, of viscose rayon, cellulose esters or polyacrylonitrile. They can also be used with advantage in the manufacture of cosmetics.

The following examples illustrate the invention:

EXAMPLE 1

47 g. by weight of 3-nitro-4-chlorophenylmethylsulfone, 20 g. of methylenedianiline, 50 g. of anhydrous sodium acetate, and 650 g. of 95% ethanol are stirred for 24 hours at 130° C. in an autoclave. The reaction mass is cooled, filtered and washed with 95% ethanol and then with a thorough water wash.

52 g. of a yellow dyestuff of the formula

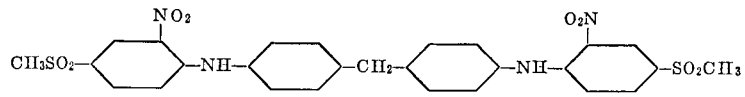

are obtained.

EXAMPLE 2

47 g. by weight of 3-nitro-4-chlorobenzenesulfonylamide and 20 g. of methylenedianiline are added to a solution of 120 g. of sodium acetate in 80 g. of water at 95% C. and heated for 12 hours at 120° C. with stirring. The reaction mixture is diluted with 100 g. of water and filtered. The solids are washed thoroughly with water, and then with 95% ethanol.

53 g. of a yellow dyestuff of the formula

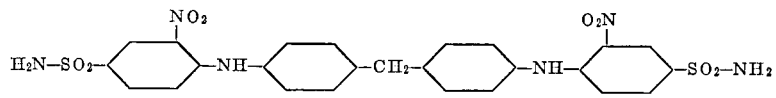

are obtained.

EXAMPLE 3

59 g, by weight of 3-nitro-4-chlorophenylmethylsulfone, 14 g. of m-phenylenediamine, 27 g. of sodium acetate, and 3 g. of a dispersing agent are heated in 450 g. of water at reflux for 24 hours with good agitation. The product is filtered off and washed thoroughly with hot water.

62 g. of a yellow dyestuff of the formula

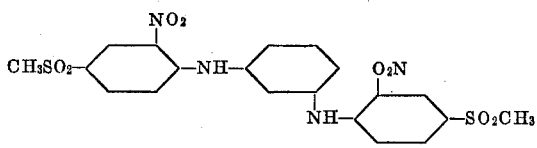

are obtained.

EXAMPLE 4

59 g. of 3-nitro-4-chlorophenylmethlysulfone and 7.5 g. of ethylenediamine are added to a solution of 150 g. of sodium acetate in 100 g. of water at 95° C. and heated for 18 hours at 116° C. with stirring. The reaction mixture is diluted with 200 g. of water and filtered. The solids are thoroughly washed with hot water, and then with 95% ethanol.

50 g. of a greenish-yellow dyestuff of the formula:

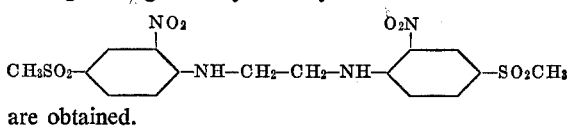

are obtained.

EXAMPLES 5–8

Following the procedure of Example 1 the following dyestuffs were prepared by combining the appropriate 4-halo-3-nitrobenzene-alkylsulfone and aromatic diamine:

(5)
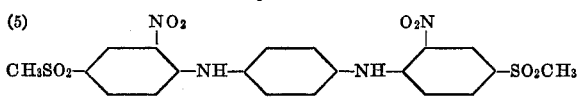

(6)
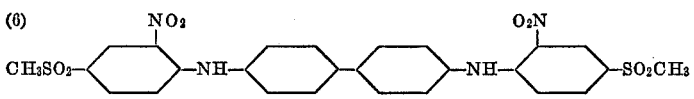

(7)

(8)
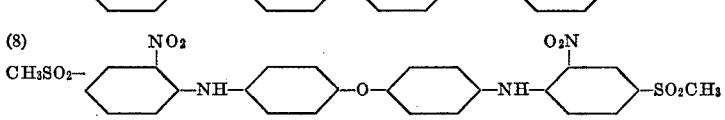

EXAMPLE 9

15 g. of the dyestuff of Example 1 are brought to a state of fine dispersion by milling in a ball mill with 10 g. of the condensation product of naphthalene-2-sulfonic acid with formaldehyde and 75 g. of water.

An aqueous preparation containing 67 g. of the above dyestuff dispersion and 0.5 g. of sodium alginate per liter is padded onto fabric of polyethylene terephthalate fiber and squeezed to 65% pick-up. The padded material is then air dried and subsequently heat treated at 220° C. for 1 minute. The dyed fabric is scoured for 5 minutes at the boil in a solution containing 3% of sodium diisobutylnaphthalene monosulfate and 5% sodium carbonate and then dried. A yellow dyeing is obtained, characterized by good penetration and excellent fastness to light and sublimation.

EXAMPLE 10

The procedure of Example 9 is repeated, except that 7.5 g. each of the yellow dyes obtained in Examples 2 and 3 are employed for the dispersion. A yellow dyeing is obtained characterized by good penetration and excellent fastness to light and sublimation.

I claim:
1. Aromatic polyester fiber dyed with a compound of the formula

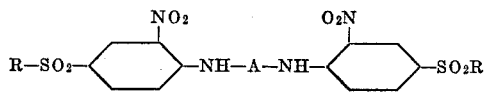

wherein A is a divalent radical selected from the group consisting of

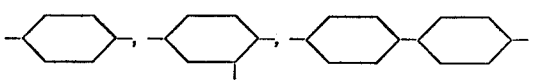

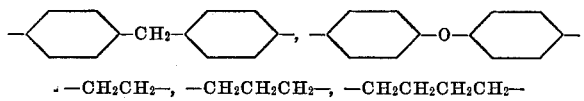

, —CH$_2$CH$_2$—, —CH$_2$CH$_2$CH$_2$—, —CH$_2$CH$_2$CH$_2$CH$_2$—

R is alkyl, aralkyl, NH$_2$, NHR$_1$, or NR$_1$R$_2$ where R$_1$ is lower alkyl, or phenyl and R$_2$ is lower alkyl.

2. Polyester fiber according to claim 1 wherein the polyester is polyethylene terephthalate.

3. Polyester fiber according to claim 2 wherein the compound is

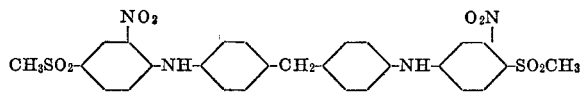

4. Polyester fiber according to claim 2 wherein the compound is

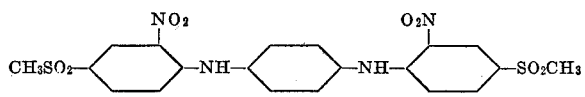

5. Polyester fiber according to claim 2 wherein the compound is

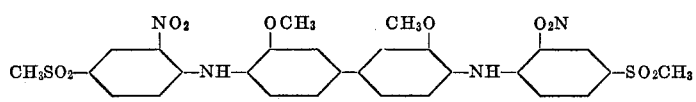

6. Polyester fiber according to claim 2 wherein the compound is

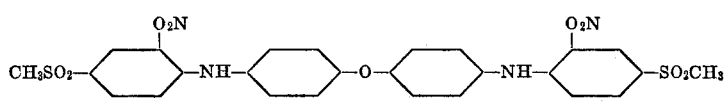

7. Polyester fiber according to claim 2 wherein the compound is

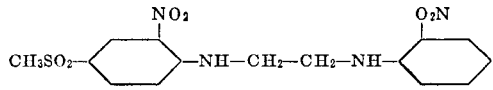

8. Process of dyeing fiber materials of aromatic polyesters which comprises impregnating said fiber materials with an aqueous dispersion of a dyestuff of the formula

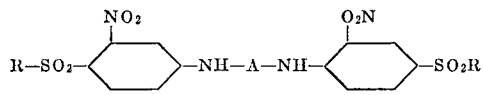

wherein A is a divalent radical selected from the group consisting of

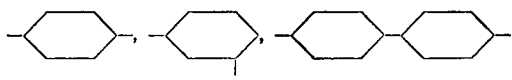

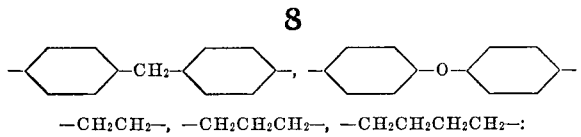

$-CH_2CH_2-$, $-CH_2CH_2CH_2-$, $-CH_2CH_2CH_2CH_2-$:

R is alkyl, aralkyl, $NH_2$, $NHR_1$, or $NR_1R_2$ where $R_1$ is lower alkyl or phenyl and $R_2$ is lower alkyl, and subsequently fixing said dyestuff on the fiber at a temperature of about 120–220° C.

References Cited
UNITED STATES PATENTS

| | | | |
|---|---|---|---|
| 3,239,546 | 3/1966 | Bement | 260——397.7 |
| 3,254,934 | 6/1966 | Schwarz et al. | 8—172 X |
| 3,399,028 | 8/1968 | Illy | 8—179 |

GEORGE F. LESMES, Primary Examiner

T. J. HERBERT, Jr., Assistant Examiner

U.S. Cl. X.R.

8—179; 260—397.6, 397.7